B. T. BOSSERMAN.
SUPPLEMENTAL BEEHIVE CASING.
APPLICATION FILED JAN. 24, 1913.
1,067,459.
Patented July 15, 1913.
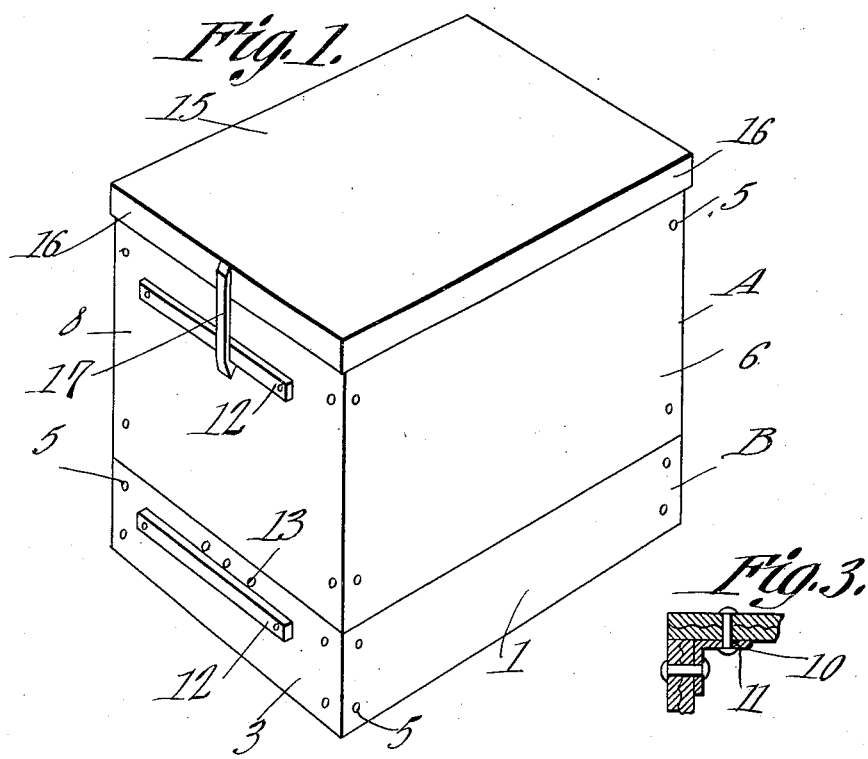
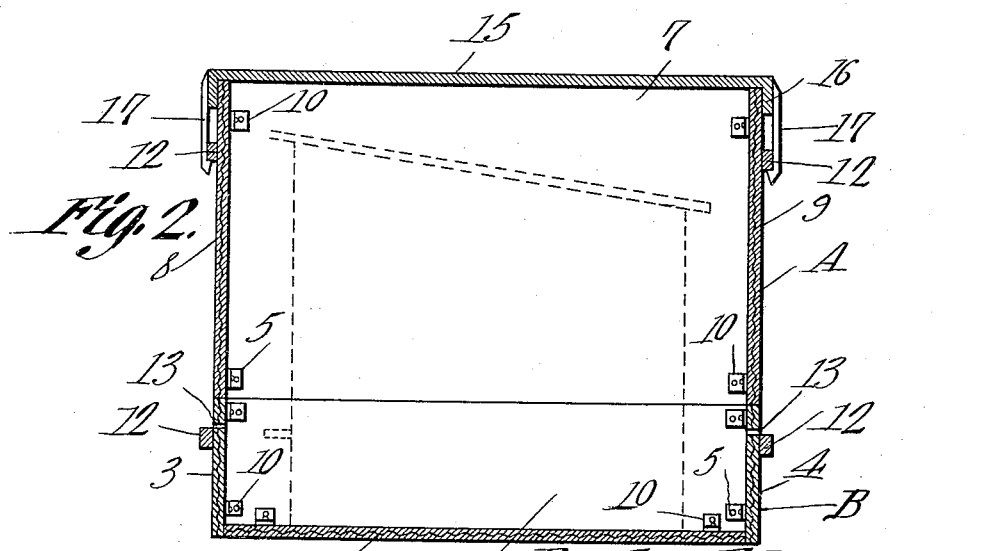
Witnesses
Benton T. Bosserman,
Inventor
by
Attorneys

UNITED STATES PATENT OFFICE.

BENTON T. BOSSERMAN, OF WILLIAMSTOWN, OHIO.

SUPPLEMENTAL BEEHIVE-CASING.

1,067,459.  Specification of Letters Patent.  Patented July 15, 1913.

Application filed January 24, 1913. Serial No. 744,024.

*To all whom it may concern:*

Be it known that I, BENTON T. BOSSERMAN, a citizen of the United States, residing at Williamstown, in the county of Hancock and State of Ohio, have invented a new and useful Supplemental Beehive-Casing, of which the following is a specification.

This invention relates to a protector or casing for bee hives.

The object of the present invention is to provide a novel bee hive casing or protector which completely incloses a bee hive.

A further object is to provide a bee hive casing which is composed of concrete slabs, is demountable and may therefore be readily shipped or transported.

A further object is to provide a bee hive casing adapted to protect single wall bee hive walls from the weather and further to be secure against the entrance of mice and vermin.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a perspective view of my improved supplemental bee hive casing. Fig. 2 is a cross sectional view in elevation thereof. Fig. 3 is a fragmental view of a corner of the casing.

Referring to the drawings in which similar reference numerals designate corresponding parts throughout the several views, A and B are the upper and lower sections of my improved demountable supplemental bee hive casing or protector. The lower section B is composed of the side walls 1 and 2 and the end walls 3 and 4. These walls are preferably formed as rectangular cement slabs and are fastened together by angle irons disposed at the ends thereof and securely held thereto by means of the bolts 5.

The upper section A is similar in construction and comprises the side walls 6 and 7 and the end walls 8 and 9, these walls being also composed of concrete slabs detachably secured together to define a rectangular boxing.

The manner in which the various walls of the sections are detachably secured together is more clearly illustrated in Fig. 3 and is effected by means of the angle irons 10 which are provided with suitable apertures 11 in the legs thereof through which extend the fastening bolts 5 the walls being provided with suitable apertures through which the bolts 5 extend.

In order that the sections may be easily handled, suitable gripping rods or members 12 are secured to the end walls of the two sections and are securely held thereto by means of bolts or other securing means extending through and clamping against the concrete walls of the sections. These gripping members 12 perform other functions however. The gripping member upon the front end wall of the lower section is spaced a slight distance below the bee entrance aperture 13 and therefore the upper edge of this gripping member provides a suitable base or platform upon which the bees may alight. The gripping members upon the upper section A act in the capacity of a hook against which the latch members of the cover engage as more fully hereinafter disclosed.

A concrete base 14 is secured at the bottom of the section B and lies within the side walls thereof. The base 14 has been illustrated in Fig. 2 as being clamped or secured to the walls of the lower section but in this connection it is to be understood that it is only necessary that the base 14 be secured to the side walls when the supplemental bee hive casing is positioned upon an irregular or unsmooth surface. A cover is adapted to be mounted upon the upper extremity of the upper section A and comprises a top plate 15 with flanges 16 depending therefrom, the said top plate 15 and flanges 16 being preferably formed of wood and adapted to fit over and embrace the upper portion of the walls of the casing or section. In order that the cover may be securely held in position upon the top section, suitable latch or fastening means are illustrated as comprising the depending latch hooks 17 which are composed of some resilient material and are adapted to snap over and engage the under portion of the gripping members 12 secured upon the end walls of the upper section A.

From the foregoing description it will be apparent that my improved supplemental bee hive casing or protector is adapted to receive a bee hive therein such as illustrated in dotted lines in Fig. 2 and to provide a boxing which will protect the hive incased therein from the weather and furthermore by reason of the concrete construction of the sections, the hive will be protected against mice and vermin and should the hive be in a locality where frigid temperatures are not uncommon, a suitable packing may be inserted between the outer portions of the hive and the walls of the supplemental casing. Furthermore it will be apparent that during warm weather, suitable wedges may be positioned between the upper and lower sections A and B and the section A raised a distance thereabove which will allow for a suitable circulation of air in and around the hive.

The construction of the entire casing will render the same easy and cheap to manufacture and embodying the desirable feature of being demountable and readily transported from place to place.

It is to be understood that the number of sections used and the position of the bee entrances will be optional and may be varied according to the size of the hive intended to be protected.

Having thus fully disclosed the construction of my improved device, what I claim to be new and original with me is:—

A sectional supplemental bee hive casing comprising a lower section formed of rectangular concrete slabs detachably secured together, a base disposed within and adjacent the lower extremity of the said lower section and detachably secured thereto, an upper section including rectangular concrete slabs detachably secured together, the said upper section adapted to rest upon and line with the said lower section, gripping members secured to the end walls and disposed a relatively small distance from the upper extremity of the said sections, the said gripping members adapted to form bee alighting platforms for the lower section, the upper section gripping members comprising one member of a latch, a cover adapted to fit over the upper section and provided with downwardly extending resilient members adapted to engage the said upper section gripping members and to secure the cover thereto, the said engaging means forming the other member of the said latch, said upper and lower sections, base and cover, adapted to house a bee hive therein.

In testimony that I claim the foregoing as my own, I have hereto affixed my signature in the presence of two witnesses.

BENTON T. BOSSERMAN.

Witnesses:
W. H. REES,
R. W. SHARE.

---

Copies of this patent may be obtained for five cents each, by addressing the "Commissioner of Patents, Washington, D. C."